United States Patent

Hamilton et al.

[11] 4,066,890
[45] Jan. 3, 1978

[54] ROTOR TIP LIGHT CONTROL

[75] Inventors: Charles W. Hamilton, Colonia; Alfred Kleider, Ocean, both of N.J.

[73] Assignee: The United States of America as represented by the Secretary of the Army, Washington, D.C.

[21] Appl. No.: 726,364

[22] Filed: Sept. 24, 1976

[51] Int. Cl.$^2$ ............................................. H04B 9/00
[52] U.S. Cl. ........................................ 250/199; 340/25
[58] Field of Search .............. 250/199; 340/25, 189 M

[56] References Cited

U.S. PATENT DOCUMENTS

| 3,174,552 | 3/1965 | Soucy, Jr. ........................ 340/25 |
| 3,289,001 | 11/1966 | Wilcox ............................ 250/199 |
| 3,534,351 | 10/1970 | Harnden, Jr. et al. ........... 250/199 |
| 3,619,612 | 11/1971 | Belke et al. .................. 340/189 M |
| 3,820,070 | 6/1974 | Fox ................................ 250/199 |

FOREIGN PATENT DOCUMENTS

| 1,396,865 | 6/1975 | United Kingdom ................ 250/199 |

*Primary Examiner*—Richard Murray
*Attorney, Agent, or Firm*—Nathan Edelberg; Jeremiah G. Murray; Edward Goldberg

[57] ABSTRACT

A control circuit for controlling the intensity of a plurality of lights mounted at the ends of the rotor blades of a helicopter. The control circuit is completely self-contained and is powered by a wind-driven generator mounted to the blades. Commands to alter the intensity of the lights or to switch the lights on or off are transmitted by a pulsed light beam mounted on the helicopter tail boom.

8 Claims, 4 Drawing Figures

TABLE I

SWITCH POSITION AND FUNCTION

| POSITION | FUNCTION | TRANSMITTED CODE |
|---|---|---|
| 1 | DIM | ⎍ |
| 2 | CYCLE | ⎍⎍⎍⎍ |
| 3 | MED | ⎍⎍ |
| 4 | CYCLE | ⎍⎍⎍ |
| 5 | BRIGHT | ⎍⎍⎍⎍ |
| 6 | OFF | ⎍ |

ROTOR TIP LIGHT CONTROL

GOVERNMENT LICENSE

The invention described herein may be manufactured and used by or for the government for governmental purposes without the payment of any royalties thereon or therefor.

BACKGROUND OF THE INVENTION a. Field of the Invention

Broadly speaking, this invention relates to a control circuit for helicopter rotor tip lights, and the like. More particularly, in a preferred embodiment, this invention relates to a control circuit for controlling the operation and/or intensity of helicopter rotor tip lights without the necessity of providing a physical connection between the main body of the helicopter and the rotating rotor blades.

b. Discussion of the Prior Art

Helicopter pilots have found that in night time operations it is highly advantageous to illuminate the tips of their rotor blades. For example, such illumination assists pilots to safely position their helicopters when flying in close formation, assists in landing the helicopters, and provides an indication of range by virtue of the angular subtent of the described light path.

Of course, some means must be provided to supply power to the rotor tip lights and it must also be possible to energize and deenergize the lights at will because it would obviously be inadvisable to have the rotor tip lights illuminated when flying over hostile territory, for example. Further, it is also advantageous to be able to alter on command the intensity of the illumination, for example, from high to medium to low, depending on the circumstances and use to which the illumination is to be put.

The control panel for these functions must, of course, be physically located close to the pilot and heretofore the connection between the panel circuitry in the main body of the helicopter and the rotor tip lights has been accomplished by means of slip-rings and commutators positioned about the rotor shaft with wires running internally through the rotor blades.

Unfortunately, this has not proved to be satisfactory in practice due to the high speed at which the shaft rotates as well as the high g-forces and vibration to which the commutators, wiring and slip-rings are subjected during flight. The problem, then, is to devise some technique for both energizing and controlling the rotor tip lights which does not rely on a direct mechanical and electrical connection between the rotating blades and the main body of the helicopter.

SUMMARY OF THE INVENTION

These and other problems have been solved by the instant invention which, in a preferred embodiment, comprises a rotor tip light which is mounted to the extremity of at least one of the rotor blades of the helicopter. The helicopter includes means, such as a wind-driven generator, mounted to the rotor blade for supplying electrical energy to the rotor tip light. More specifically, the invention comprises means, mounted to the rotor blade, for controlling the operation of the rotor tip light and means, synchronized with the rotation of the rotor blades, for transmitting coded optical signals to the controlling means to instruct the same to selectively energize or deenergize the rotor tip light.

The invention and its mode of operation will be more fully understood from the following detailed description, when taken with the appended drawings in which:

DETAILED DESCRIPTION OF THE INVENTION

Figure 1:
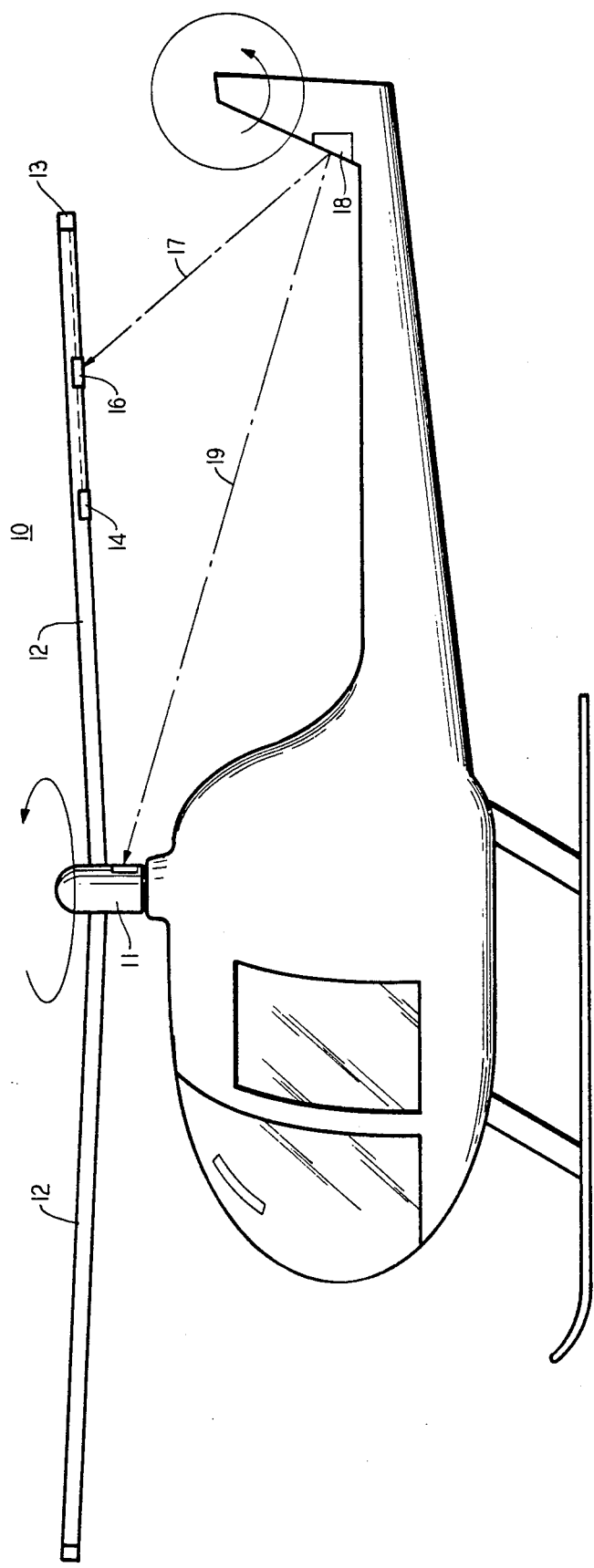
FIG. 1 is a partially isometric, partially block schematic diagram which illustrates the operating environment for the invention.

FIG. 1 depicts the operating environment for the instant invention. It should be stressed that the arrangement shown in FIG. 1 is merely illustrative and that any other configurations are possible.

As shown, helicopter 10 includes a rotating shaft 11 with a plurality of rotor blades 12 affixed thereto. Each of the rotor blades has a light 13 mounted to the extremity thereof. At least one of the rotor blades further includes a wind-driven generator 14 and a control circuit 16, which will be discussed in considerably more detail below. As will be explained, the lights 13 are turned on and off, and their intensity selectively altered, by means of a coded light beam 17 which is transmitted to an optical sensor in the control circuit from some suitable optical source 18 in the tail boom of the helicopter. A second light beam 19 is directed onto a retroflective strip 21, mounted to the shaft 11, to synchronize the transmission of the coded light beam to control circuit 16. Advantageously, both beams 17 and 19 are generated by GaAs solid state lasers provided with suitable focusing lenses to collimate the beams. Synchronization may also be achieved by means of magnetic proximity switches mounted on the rotor shaft.

For most applications, it will suffice for control circuit 16 to provide four functions for the lights 13, "DIM," "MEDIUM" and "BRIGHT" intensity and "ON/OFF". According to the invention, the intensity of illumination is controlled by a plurality of SCR's which are selectively gated on, in accordance with the coded light beam, to add successive current increments to the lamp filaments. A fourth SCR controls the on-off function. The detector for beam 17 is advantageously a Si photodiode equipped with a suitable optical filter to select the GaAs output. The control circuit includes logic circuitry which acts as a six position, unidirectional switch, with functions as shown in FIG. 3.

Figures 2, 3:
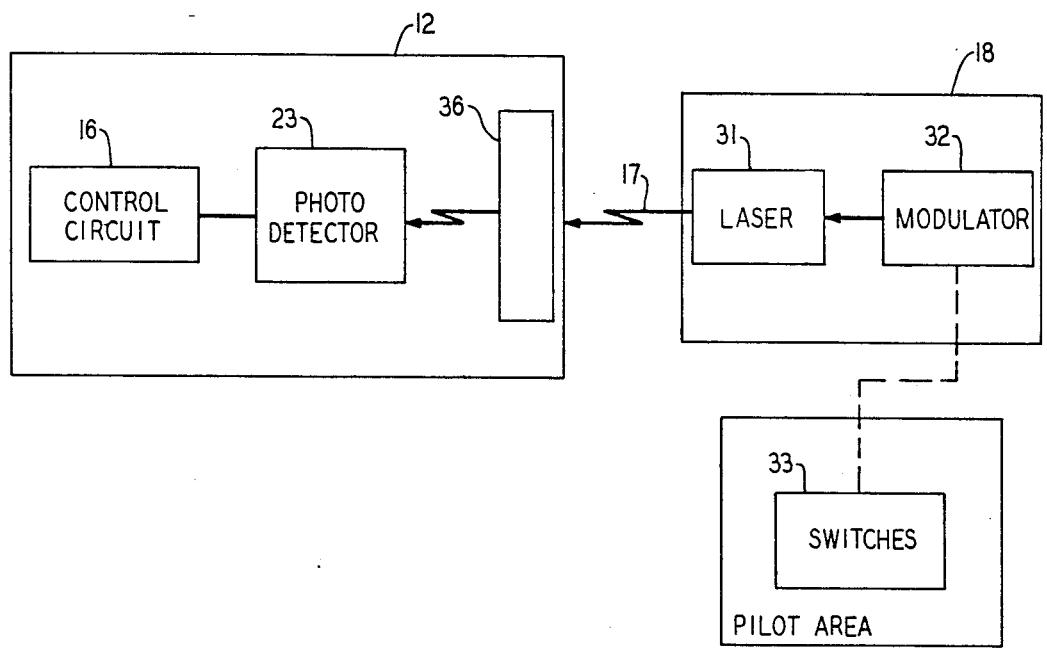
FIG. 2 is a block schematic diagram illustrating a portion of FIG. 1 in more detail.
FIG. 3 is a table showing various pulse commands for controlling the apparatus shown in FIGS. 2 and 4.

FIG. 2 depicts the laser beam generator in slightly more detail. As shown, optical source 18 comprises a GaAs solid-state laser 31 and a modulator 32 which receives command instructions from a switch 33 located in the area of the helicopter pilot. Switch 33 might comprise, for example, a four-position rotary switch marked "OFF"; "DIM"; "MEDIUM" and "BRIGHT", or other similar arrangement.

Mounted to the rotor 12 is control circuit 16, which is connected to the output of photo-detector 23, illustratively a Si photo-diode. An optical filter 36 is positioned in front of detector 23 to exclude all light other than that of a wavelength compatible with the output of GaAs laser 31.

Now, a typical rotor blade rotates at 300 r.p.m.; thus, a pulse rate of 30 KHZ was selected for beam 17. This is so because $$300 \text{ RPM} = 5 \text{ RPS} = 1800°/\text{Sec}$$

and $$1/30 \text{ KHZ} = 3.3 \times 10^{-5} \text{ sec.}$$

Thus, the amount that the rotor will move during each pulse interval is given by $$d = (1.8 \times 10^{3\circ}/\text{sec})(3.3 \times 10^{-5}\text{sec})(17.45 \times 10^{-3}\text{rad}/0°) = 1.05 \text{ milliradian/pulse.}$$

Now, as shown in FIG. 3, since a maximum of three pulses are transmitted in each command, the rotor blade will only move slightly over 3 milliradians during a pulse interval, which is well within the normal beam width of a simple, junction GaAs laser diode, nominally 4 milliradians.

Figure 4:
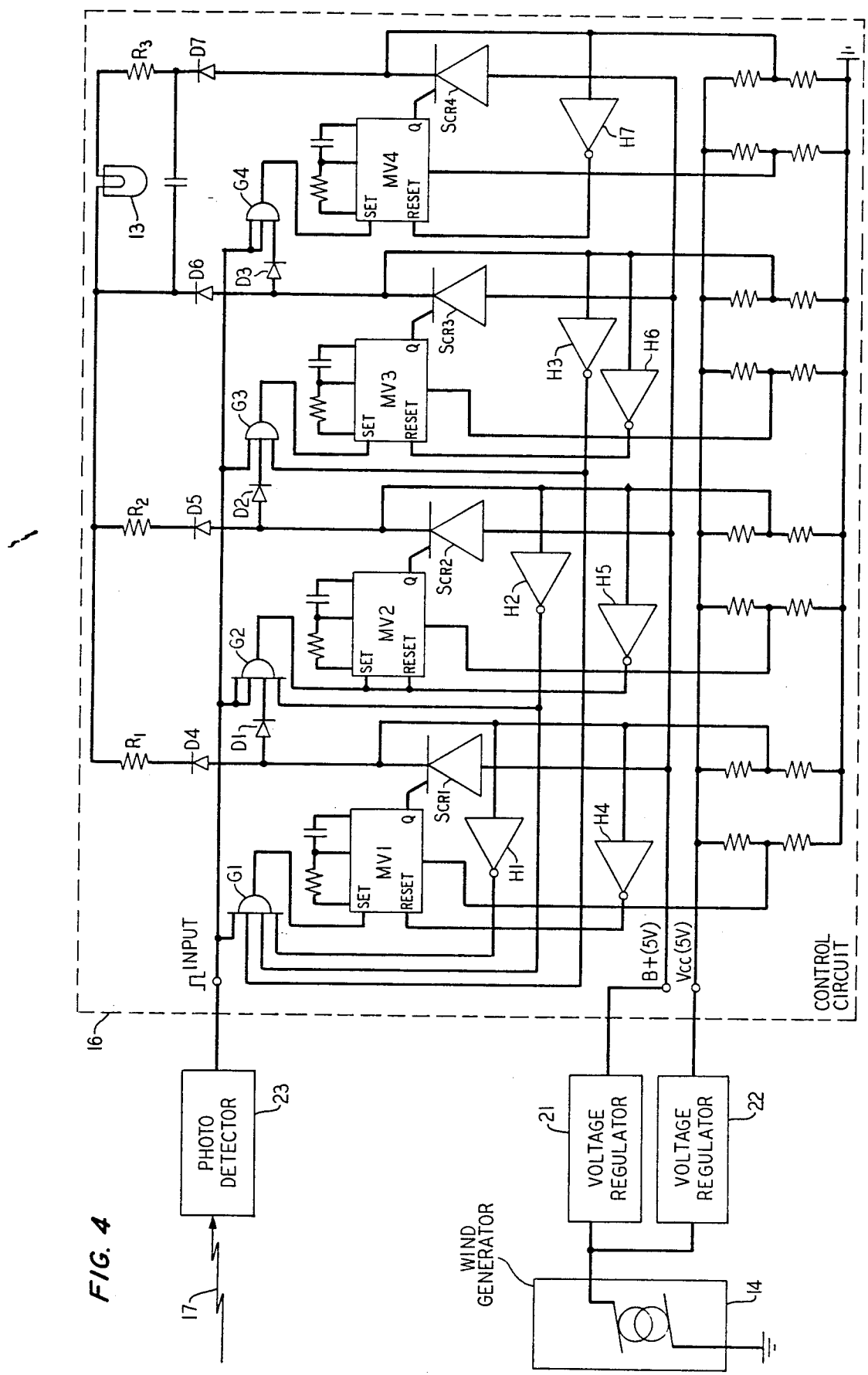
FIG. 4 is a schematic diagram of an illustrative embodiment for the control circuit shown in FIGS. 1 and 2.

FIG. 4 depicts an illustrative embodiment of control circuit 16. As shown, the output of wind-driven generator 14 is applied to a pair of voltage regulators 21 and 22. The output of regulator 21 (designated B+) is applied to the anode of four silicon control rectifiers $SCR_1$ - $SCR_4$, respectively. The cathode of $SCR_1$ is connected, via a diode $D_4$ and a resistor $R_1$, to lamp 13. In like fashion, the cathode of $SCR_2$ is connected to lamp 13 via diode $D_5$ and resistor $R_2$, and the cathode of $SCR_3$ is connected to lamp 13 via diode $D_6$. The cathode of $SCR_4$, however, is connected via diode $D_7$ and resistor $R_3$ to the grounded side of lamp 13.

The incoming coded light beam 17 is applied to the silicon photo-detector 23, the output of which forms the input of control circuit 16. This input signal is applied simultaneously to quad-input NAND-gates G1 and G2 and three-input NAND-gates G3 and G4. The output of gates G1 - G4 are applied to the control electrodes of $SCR_1$ - $SCR_4$, via multivibrators $MV_1$ - $MV_4$, respectively. The cathode of $SCR_4$ is connected, via an inverter $H_7$, to the reset input of multivibrator $MV_4$. The cathode of $SCR_3$ is connected, via an inverter $H_6$, to the reset input of multivibrator $MV_3$ and, via an inverter $H_3$, to one input of NAND-gates G3 and G1. The cathode of $SCR_2$ is connected, via an inverter $H_2$, to another input of NAND-gate G1 and, via an inverter $H_5$, to the reset input of multivibrator $MV_2$. Finally, the cathode of $SCR_1$ is connected, via an inverter $H_1$, to yet another input of NAND-gate G1 and, via an inverter $H_4$, to the reset input of multivibrator $MV_1$. The cathode of $SCR_1$ is connected, via a diode $D_1$, to another input of NAND-gate G2. In like fashion, the cathodes of $SCR_2$ and $SCR_3$ are connected, via diodes $D_2$ - $D_3$, to additional inputs of NAND-gates G3 and G4, respectively. Diodes D4, D5 and D6 are blocking diodes that prevent a signal being fed backwards to trigger on an SCR when any other SCR is "on" and lamp 13 is lighted. Diodes $D_1$, $D_2$ and $D_3$ are used to maintain the associated gate inputs above ground. A series of voltage-dividers connected to voltage regulator 22 ($V_{cc}$) power the multivibrators $MV_1$ - $MV_2$ and also supply bias to $SCR_1$ - $SCR_4$.

In operation, $SCR_1$ controls lamp 13 when "DIM" intensity illumination is desired. To that end, resistor $R_1$ is selected to limit the current through lamp 13 to a low level. $SCR_2$ controls the "MEDIUM" intensity illumination and to that end $R_2$, which is smaller than $R_1$, provide a somewhat greater circuit flow to lamp 13, $SCR_3$ controls the "BRIGHT" intensity illumination; thus, no resistor is employed in the current path and when $SCR_3$ is fired, the full supply voltage (B+) is applied to lamp 13. $SCR_4$ controls the "ON-OFF" function and when gated "ON" applies a pulse to NAND-gate G4, via a capacitor which turns of all the SCR's.

Assume that the "DIM" intensity illumination is required. As shown in FIG. 2, a single pulse will be applied to the input of control circuit 16. This pulse will cause the output of gate G1 to go low, because inverters $H_1$, $H_2$ and $H_3$ will supply a "high" to the other inputs of gate G1. The low applied to multivibrator $MV_1$ will cause the output thereof to go high, thus triggering $SCR_1$ and lighting lamp 13, via current limiting resistor $R_1$. Actually, multivabrators $MV_1$ - $MV_4$ are provided to "stretch" the output pulses from the varius NAND-gates (nanosecond range) to a pulse which is capatible with the requirements of the SCR's (microsecond range). Once $SCR_1$ is turned "on", inverter $H_1$ will inhibit gate G1 from further action until the next command is received.

The operations for "MEDIUM" and "BRIGHT" illumination is entirely analogous. For example, for "MEDIUM", FIG. 3 shows that two successive pulses will be received by the control circuit. The first pulse is, of course, applied to all gates, but as above described only gate G1 can respond to this pulse because one input to gate G2 is obtained from the cathode of $SCR_1$, initially "off" when the first pulse is received. In like manner, gates G3 and G4 are also inhibited from responding to the first pulse. However, after $SCR_1$ is turned "on", gate G2 is now enabled by virtue of the B+ potential on the cathode of $SCR_1$. Thus, when the second pulse arrives, $SCR_2$ will turn "on" supplying a higher current level to lamp 13. The arrival of a third pulse will turn $SCR_3$ "on" and the arrival of a single additional pulse will turn $SCR_4$ "on" and extinguish lamp 13, as required.

One skilled in the art may make various changes and alterations to the layout of parts shown without departing from the spirit and scope of the invention.

What is claimed is:

1. In combination with a helicopter having a shaft and a plurality of rotor blades fastened at one end to said shaft;

A rotor tip light mounted to the other end of at least one of said rotor blades;

means mounted to said one rotor blade for supplying electrical current to said rotor tip light;

means mounted to said rotor blade for controlling said current to said rotor tip light in a plurality of selective discrete incremental levels to change the intensity of said light; and means mounted on the main body of said helicopter and synchronized with the rotation of said rotor blades for transmitting coded optical signals to said controlling means to instruct the same to selectively apply said incremental levels of current to said rotor tip light.

2. The apparatus according to claim 1 wherein said means for transmitting coded optical signals is a source of light pulses synchronized with the rotation of said rotor blades.

3. The apparatus according to claim 2 wherein said source of light pulses is:
- a laser mounted to the main body of said helicopter for directing a beam of radiant energy onto said controlling means; and
- means for modulating the output of said laser with the instructions for said controlling means, and said controlling means further comprises:
- a photo-detector for receiving said coded optical signal; and
- an optical filter positioned in front of said photo-detector for filtering out all optical radiation other than the output of said laser.

4. The apparatus according to claim 3 wherein said controlling means comprises:
- a plurality of silicon-controlled-rectifiers and resistors connected between said current supplying means and said rotor tip light for supplying selective incremental levels of current to said light, when rendered conductive; and
- means, connected to the control electrodes of said silicon-control-rectifiers for decoding the coded output signal of said photo-detector and for selectively activating particular ones of said silicon-control-rectifiers whereby the desired intensity of illumination for said rotor tip light is achieved.

5. The apparatus according to claim 4 wherein said decoding means comprises a plurality of NAND-gates, each gate having an output connected to the control electrode of the corresponding silicon-control-rectifier, an input connected to the output of said photo-detector and at least one other input connected, via an inverter, to the cathode of the next succeeding silicon-control-rectifier in the decoder.

6. The apparatus according to claim 5 wherein said decoding means further includes a bistable multivibrator interconnected between the output of each gate and the corresponding control electrode of the associated silicon-control-rectifier to stretch the output pulse from said gate.

7. The apparatus according to claim 6 wherein said decoding means further comprises an additional silicon-control-rectifier to energize and deenergize said rotor tip light, said additional silicon-control-rectifier being connected between said current supplying means and the terminal of said rotor tip light which does not connect to said plurality of silicon control rectifiers.

8. The apparatus according to claim 7 wherein said decoding means further comprises a NAND-gate having an output connected to the control electrode of said additional silicon-control-rectifier, a first input connected to the output of said photo-detector and a second input connected to the cathode of the last one of said plurality of silicon-control-rectifiers.

* * * * *